United States Patent
Sherman et al.

(10) Patent No.: US 10,208,996 B2
(45) Date of Patent: Feb. 19, 2019

(54) ICE TRAY ASSEMBLY

(71) Applicant: Beyond Zero, Inc., Louisville, KY (US)

(72) Inventors: Jason S. Sherman, Louisville, KY (US); D. Paul Haviland, Louisville, KY (US); Grayson P. Newland, New Albany, IN (US); L. Dennis Hall, Jr., Louisville, KY (US); G. Andrew Wiehebrink, Crestwood, KY (US)

(73) Assignee: Beyond Zero, Inc., Louisville, KY (US)

( * ) Notice: Subject to any disclaimer, the term of this patent is extended or adjusted under 35 U.S.C. 154(b) by 15 days.

(21) Appl. No.: 15/584,615

(22) Filed: May 2, 2017

(65) Prior Publication Data

US 2017/0321942 A1   Nov. 9, 2017

Related U.S. Application Data

(60) Provisional application No. 62/331,066, filed on May 3, 2016.

(51) Int. Cl.
| | |
|---|---|
| *F25C 1/00* | (2006.01) |
| *F25C 1/04* | (2018.01) |
| *A23G 9/04* | (2006.01) |
| *A23G 9/08* | (2006.01) |
| *A23G 9/22* | (2006.01) |

(52) U.S. Cl.
CPC .............. *F25C 1/04* (2013.01); *A23G 9/22* (2013.01); *C12G 3/005* (2013.01); *A23G 9/045* (2013.01); *A23G 9/083* (2013.01); *A23G 9/221* (2013.01); *F25C 2305/022* (2013.01)

(58) Field of Classification Search
CPC .. F25C 1/04; F25C 2305/022; F25C 2400/08; A23G 9/22; A23G 9/083; A23G 9/221; A23G 9/045; C12G 3/005
See application file for complete search history.

(56) References Cited

U.S. PATENT DOCUMENTS

| | | | | |
|---|---|---|---|---|
| 3,390,543 A | * | 7/1968 | Moreland, II | F25C 1/04 62/353 |
| 4,614,088 A | * | 9/1986 | Brooks | F25C 5/185 62/137 |

* cited by examiner

*Primary Examiner* — Melvin Jones
(74) *Attorney, Agent, or Firm* — Christopher & Weisberg, P.A.

(57) ABSTRACT

A tray assembly for a device for freezing a liquid, the assembly includes a frame defining an aperture. A thermally conductive tray is sized to be received within the aperture, the thermally conductive tray having a body and a lip circumferentially disposed about the body, the thermally conductive tray being seated within the aperture and defining a first surface and an opposite second surface, the first surface defining a recess and the second surface defining a plurality of receptacles. A gasket is included and sized to surround the body and to be disposed between the lip and the frame. An insulation chamber is coupled to the frame.

18 Claims, 4 Drawing Sheets

ICE TRAY ASSEMBLY

CROSS-REFERENCE TO RELATED APPLICATION

This application is related to and claims priority to U.S. Provisional Patent Application Ser. No. 62/331,066, filed May 3, 2016, entitled ICE TRAY ASSEMBLY, the entirety of which is incorporated herein by reference.

STATEMENT REGARDING FEDERALLY SPONSORED RESEARCH OR DEVELOPMENT n/a

TECHNICAL FIELD

The present invention relates to a method and system for maximizing thermal exchange between a thermal exchange element and a tray for freezing liquid alcohol and releasing the resultant frozen product.

BACKGROUND

Currently known systems for producing ice cubes have been unable to freeze alcoholic beverages containing ethanol into a frozen beverage cube. Ethanol has a freezing point of −114 degrees Celsius, which is significantly lower than the 0 degrees Celsius freezing point of water. However, attempts to freeze ethanol and serve it as an alcoholic beverage have failed because of its substantially cooler freezing point than water, coupled with a typical commercial and home freezer's capacity to only reach a temperature of −18 degrees Celsius or higher. The use of liquid nitrogen as a coolant to freeze alcohol, while sufficient to freeze liquid alcohol, presents safety concerns in its use. In particular, alcohol frozen with liquid nitrogen is too cold for consumption and may contain infused liquid nitrogen in the beverage, that when consumed and heated result in a phase change from liquid to gas which may rapidly expands in the stomach leading to gastrointestinal maladies.

TECHNICAL FIELD

The present invention relates to a method and system for maximizing thermal exchange between a thermal exchange element and a tray for freezing liquid alcohol and releasing the resultant frozen product.

BACKGROUND

Currently known systems for producing ice cubes have been unable to freeze alcoholic beverages containing ethanol into a frozen beverage cube. Ethanol has a freezing point of −114 degrees Celsius, which is significantly lower than the 0 degrees Celsius freezing point of water. However, attempts to freeze ethanol and serve it as an alcoholic beverage have failed because of its substantially cooler freezing point than water, coupled with a typical commercial and home freezer's capacity to only reach a temperature of −18 degrees Celsius or higher. The use of liquid nitrogen as a coolant to freeze alcohol, while sufficient to freeze liquid alcohol, presents safety concerns in its use. In particular, alcohol frozen with liquid nitrogen is too cold for consumption and may contain infused liquid nitrogen in the beverage, that when consumed and heated result in a phase change from liquid to gas which may rapidly expands in the stomach leading to gastrointestinal maladies.

A solution to the problem of freezing liquid alcohol is disclosed in U.S. Ser. No. 14/661,897, the entirety of which is incorporated herein by reference. In that system, a heat exchange engine is used to lower the temperature of a thermally conductive tray and the alcoholic liquid therein. To achieve this, the tray includes an aperture sized to receive at least a portion of the heat exchange engine, which maximizes thermal exchange between the thermally conductive tray and the heat exchange engine. However, it is desired to provide a tray and means of coupling the tray and the heat exchange engine to maximize thermal exchange between the tray and the heat exchange engine, thereby increasing the efficiency at which liquid alcohol is frozen within the tray. It is also desired to provide a tray that facilitates ejection of the frozen alcohol from the tray.

SUMMARY

The present invention advantageously provides a tray assembly for a device for freezing a liquid, the assembly includes a frame defining an aperture. A thermally conductive tray is sized to be received within the aperture, the thermally conductive tray having a body and a lip circumferentially disposed about the body, the thermally conductive tray being seated within the aperture and defining a first surface and an opposite second surface, the first surface defining a recess and the second surface defining a plurality of receptacles. A gasket is included and sized to surround the body and to be disposed between the lip and the frame. An insulation chamber is coupled to the frame.

In another aspect of this embodiment, the thermally conductive tray further defines a thickness, a length, a width, and a notch that extends through the thickness from the first surface to proximate the second surface.

In another aspect of this embodiment, the notch substantially bisects the recess of the thermally conductive tray.

In another aspect of this embodiment, the thickness of the body tapers from the second surface to the first surface.

In another aspect of this embodiment, the insulation chamber contains an insulation material that is at least one from the group consisting of a gel, a foam, and an aerogel.

In another aspect of this embodiment, the thermally conductive tray is sealed within the aperture with a thermal paste.

In another aspect of this embodiment, the insulation chamber includes an opening substantially equal in area to the recess.

In another aspect of this embodiment, when the thermally conductive tray is seated within the aperture, the recess is substantially co-axial with the opening.

In another aspect of this embodiment, the thermally conductive tray protrudes a distance out away from the aperture when the thermally conductive tray is seated within the aperture.

In another aspect of this embodiment, the thermally conductive tray is recessed within the frame.

In another embodiment, the tray assembly includes a frame defining an aperture and a chute. A thermally conductive tray is recessed within the frame and sized to be received within the aperture, the thermally conductive tray having a body and a lip circumferentially disposed about the body, the thermally conductive tray being seated within the aperture and defining a first surface and an opposite second surface, the first surface defining a recess and the second surface defining a plurality of receptacles. The body defines a thickness, the thickness of the body tapering from the second surface to the first surface. A gasket is sized to surround the body and to be disposed between the lip and the frame. An insulation chamber is coupled to the frame, the insulation chamber defining an opening substantially aligned with the recess, the insulation chamber substantially surrounding the first surface of the thermally conductive tray.

In another aspect of this embodiment, the recess includes a notch substantially bisecting the recess.

In another aspect of this embodiment, the insulation chamber contains an insulation material that is at least one from the group consisting of a gel, a foam, and an aerogel.

In another aspect of this embodiment, the thermally conductive tray is sealed within the aperture with a thermal paste.

In another aspect of this embodiment, the opening is substantially equal in area to the recess.

In another aspect of this embodiment, the thermally conductive tray protrudes a distance out away from the aperture when the thermally conductive tray is seated within the aperture.

In another aspect of this embodiment, the plurality of receptacles are coated with PTFE.

In another aspect of this embodiment, the insulation chamber is coupled to the chute.

In another aspect of this embodiment, the chute is disposed at an oblique angle with respect to the frame, and wherein at least a portion of the insulation coupled to the chute defines substantially the same angle as the oblique angle of the chute.

In yet another embodiment, the tray assembly includes a frame defining an aperture and a chute. A thermally conductive tray is recessed within the frame and sized to be received within the aperture. The thermally conductive tray protrudes a distance out away from the aperture when the thermally conductive tray is seated within the aperture. The thermally conductive tray has a body and a lip circumferentially disposed about the body, the thermally conductive tray being seated within the aperture and defining a first surface and an opposite second surface, the first surface defining a recess defining a circumference and the second surface defining a plurality of receptacles; the body defining a thickness, the thickness of the body tapering from the second surface to the first surface. The thermally conductive tray defines a notch substantially bisecting the recess and extending from the first surface to a position proximate the second surface. A gasket is sized to surround the body and to be disposed between the lip and the frame. An insulation chamber is coupled to the frame, the insulation chamber defines an opening substantially aligned and substantially the same circumference as the recess, the insulation chamber substantially surrounding the first surface of the thermally conductive tray. The insulation chamber is coupled to the chute. The chute is disposed at an oblique angle with respect to the frame, and at least a portion of the insulation coupled to the chute defines substantially the same angle as the oblique angle of the chute.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

As used here, relational terms, such as "first" and "second," "top" and "bottom," "front and rear," and the like, may be used solely to distinguish one entity or element from another entity or element without necessarily requiring or implying any physical or logical relationship or order between such entities or elements.

Figure 1:
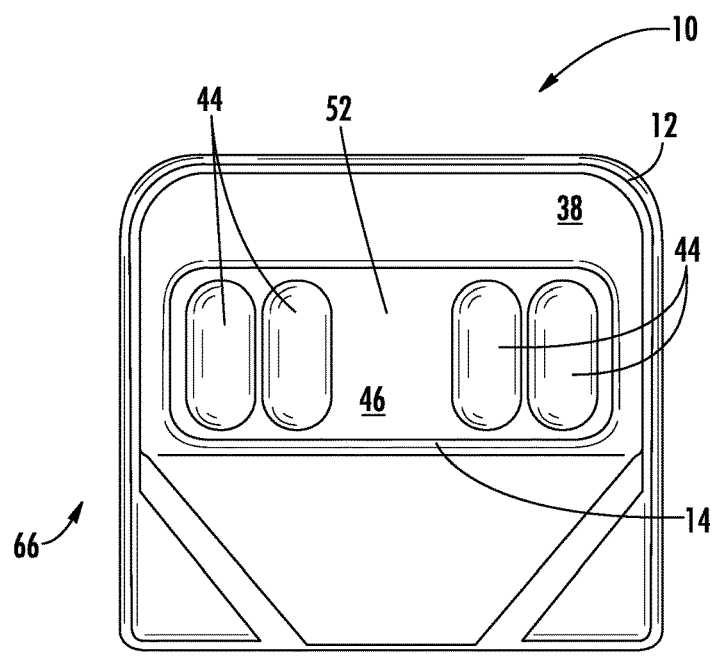
FIG. 1 shows a top view of the ice tray assembly.
Figure 2:
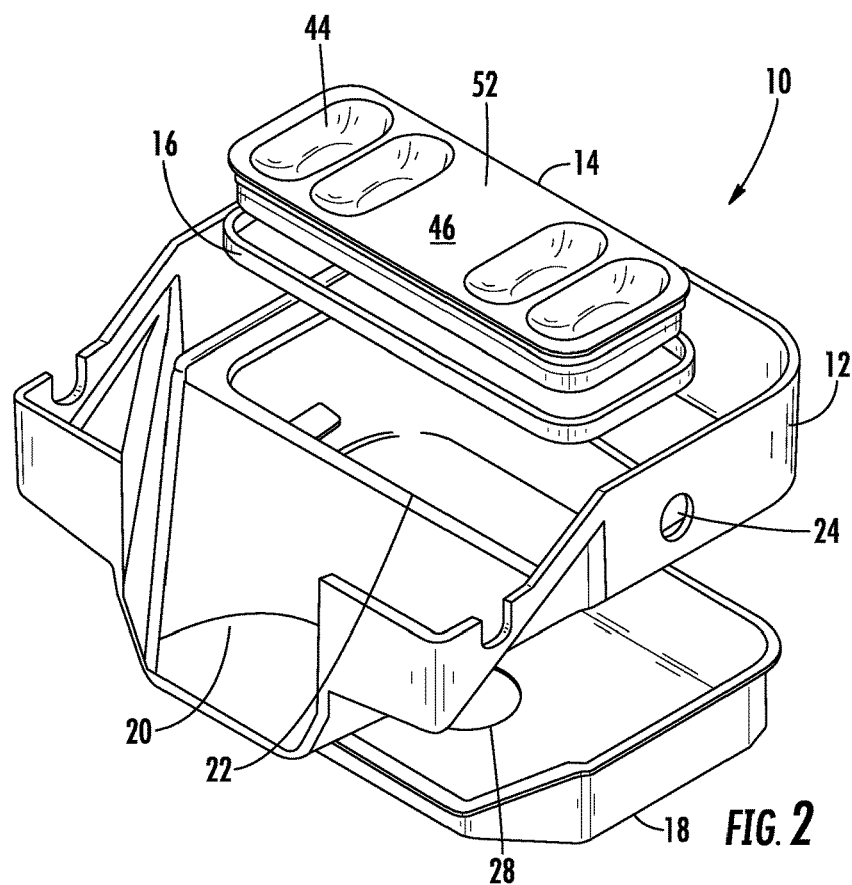
FIG. 2 shows a perspective exploded view of the ice tray assembly.
Figure 3:
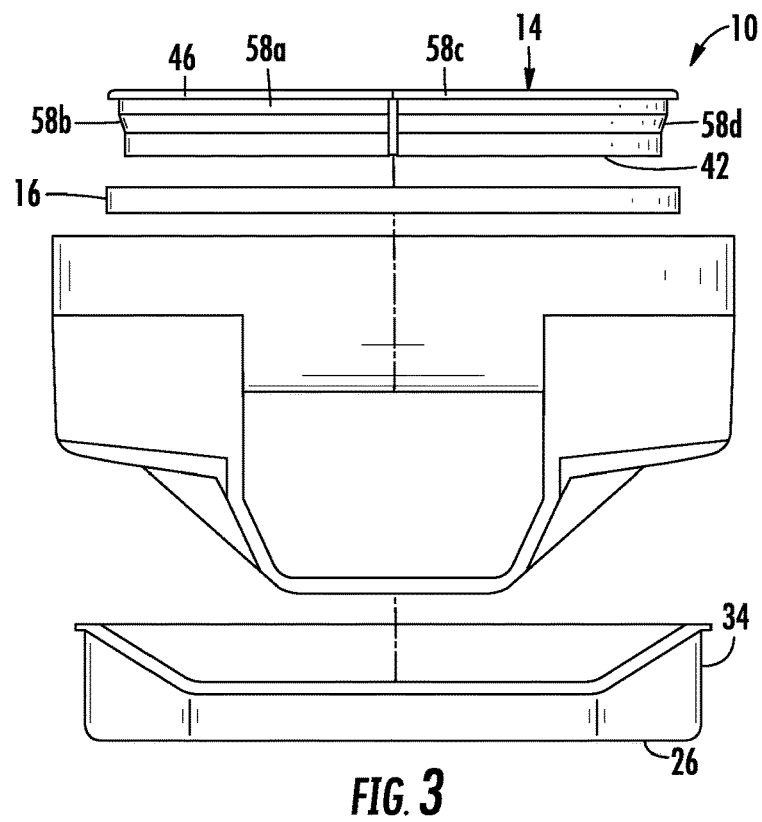
FIG. 3 shows a front exploded view of the ice tray assembly.
Figure 4:
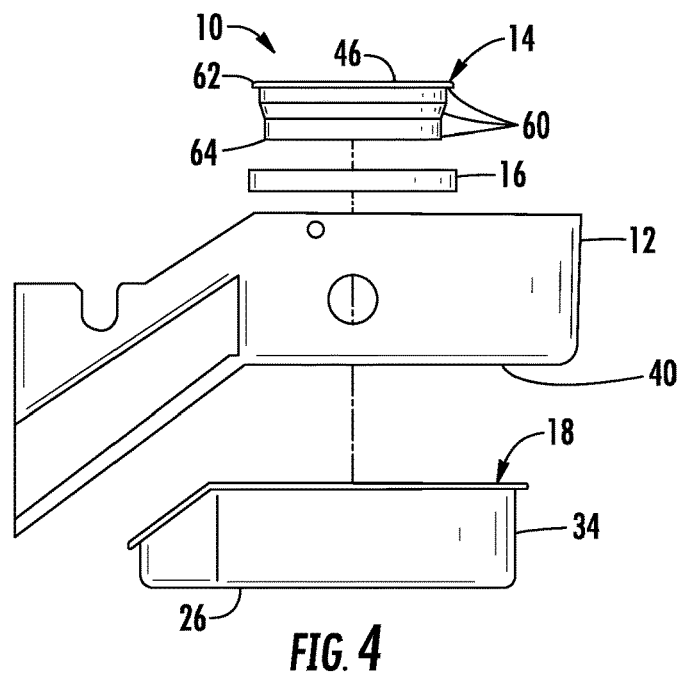
FIG. 4 shows a side exploded view of the ice tray assembly.

Now referring to the drawings in which like reference designators refer to like elements, there is shown in FIGS. 1-4, 8, and 9 an ice tray assembly 10 for a frozen alcoholic beverage maker device. The ice tray assembly 10 may generally include a frame 12 to which a thermally conductive ice tray 14, gasket 16, and insulation chamber 18 may be attached (as shown in FIGS. 2-4). The frame 12 may be composed of a rigid material, for example, plastic, metal, or a metallic alloy, or a resilient material, such as polyurethane, and may further be composed of an insulated material to minimize thermal transfer and to maintain the temperature of the frame 12 at approximately room temperature. The frame 12 may be any shape or size suitable to fit within a frozen alcoholic beverage maker, and may include a chute 20 for dispensing the frozen alcohol. The chute 20 may include a textured surface and/or a hydrophobic coating and/or an icephobic coating to prevent the frozen alcohol cubes form sticking to the chute 20 after they are ejected from the tray 14. The frame 12 may further include an aperture 22 within which the tray 14 may be seated (as shown in FIGS. 1-4). The gasket 16 may be composed of polytetrafluoroethylene (PFTE) or similar material and may be affixed to an inner surface of the aperture 22 or to an area surrounding the aperture 22 to provide a seal between the tray 14 and the frame 12. Additionally, as the liquid in the tray 14 is cooled, condensation may be produced in the frozen alcoholic beverage maker at or above the tray 14. The gasket 16 may prevent condensation and other liquids from seeping between the tray 14 and frame 12 and onto other device components. The frame 12 may further include one or more additional apertures 24 for coupling various system components to the frame, such as a frozen alcohol dislodgement element.

The insulation chamber 18 may be disposed on the bottom of the frame 12, and may be permanently or removably affixed to the frame 12 by, for example, adhesive, chemical, or heat bonding, by one or more mechanical couplings, or by other suitable means known in the art. The insulation chamber 18 may be opaque, translucent, or transparent, and may include a bottom surface 26, which may be substantially planar, with an opening or aperture 28 sized and configured to receive at least a portion of a heat exchange engine 30, such as a thermal exchange element 32, and allow the at least a portion of the heat exchange engine 30 to come into contact with the tray 14, which is described in greater detail below. Thus, the insulation chamber 18 may enclose at least a portion of the heat exchange engine 30. The insulation chamber 18 may further include a side wall 34 arising from the bottom surface 26 and defining the lateral boundaries of the insulation chamber 18. The frame 12 may include a top surface 38 and a bottom surface 40, and the upper boundary of the insulation chamber 18 may be defined by the bottom surface 40 of the frame 12 and the bottom surface 42 of the tray 14 when the ice tray assembly 10 is assembled. Additionally, the insulation chamber 18 may contain or be filled with an insulation material, such as foam, gel, aerogel, or other material with a high thermal insulating capability (R-value), and combinations thereof. The insulation material may help thermally isolate the points of contact and facilitate thermal exchange between the heat exchange engine 30 and the tray 14, decrease recovery time of tray between freeze cycles, and maintain consistently low tray temperatures. Although a substantially rectangular insulation chamber 18 is shown in the figures, the insulation chamber 18 may be any shape or size suitable for attachment to the frame and containment within the frozen alcoholic beverage maker. The insulation chamber 18 may further include one or more additional apertures for coupling various system components to the insulation chamber 18. In one configuration, the chute 20 defines an oblique angle as it extends away from the frame and the ice tray 14. At least a portion of the insulation chamber 18 may couple to the chute along the oblique angle and define the same or substantially the same angle as the oblique angle.

Figure 5:
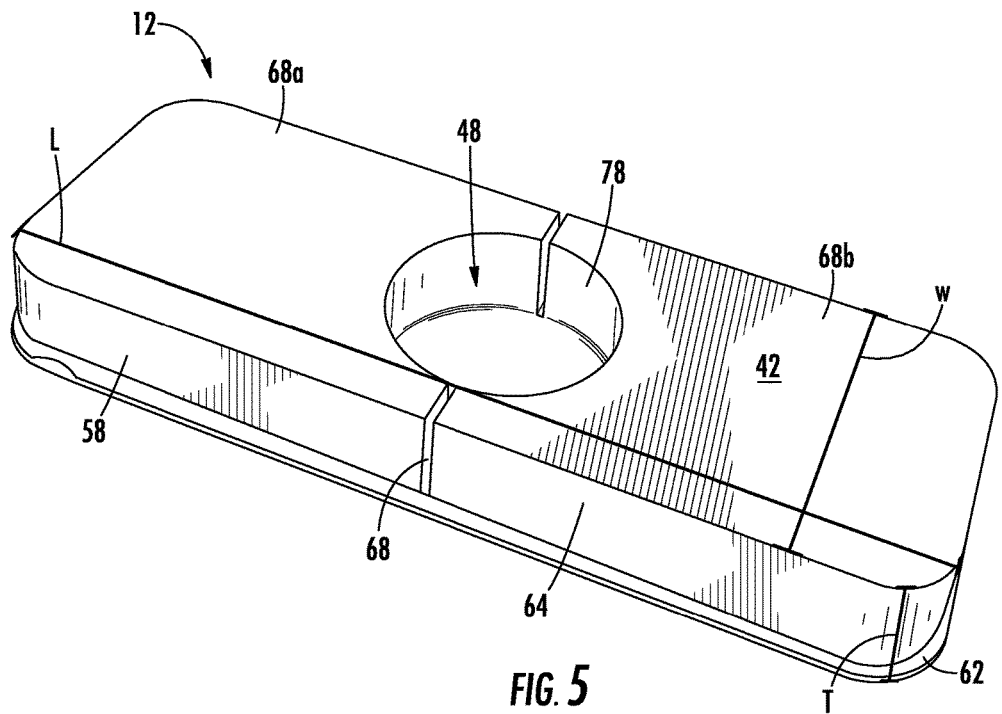
FIG. 5 shows a bottom perspective view of an ice tray.
Figure 6:
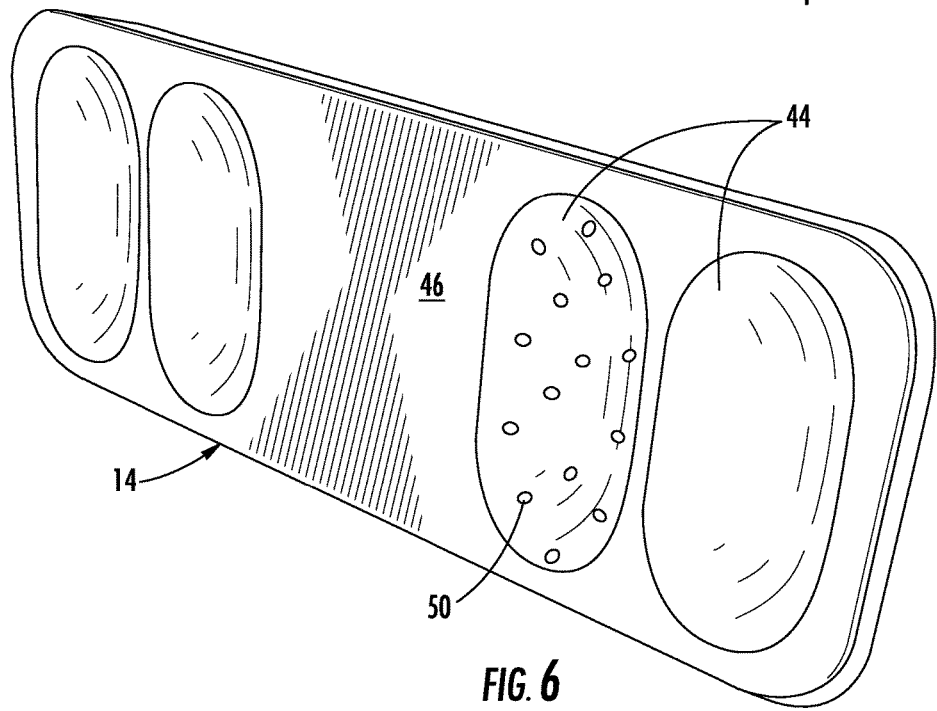
FIG. 6 shows a top perspective view of the ice tray.
Figure 7:
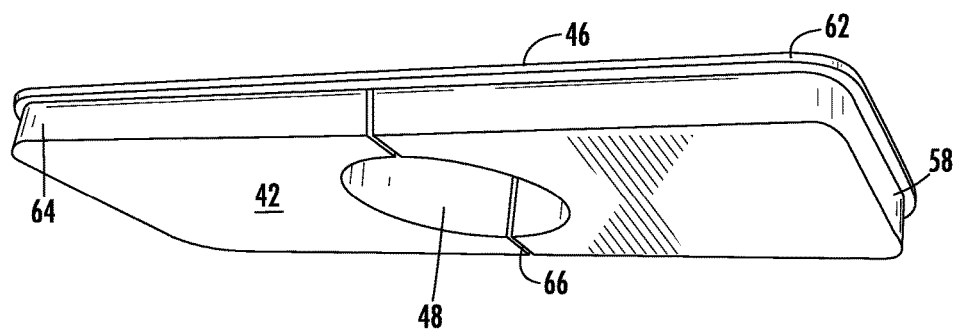
FIG. 7 shows another bottom perspective view of the ice tray.
Figure 8:
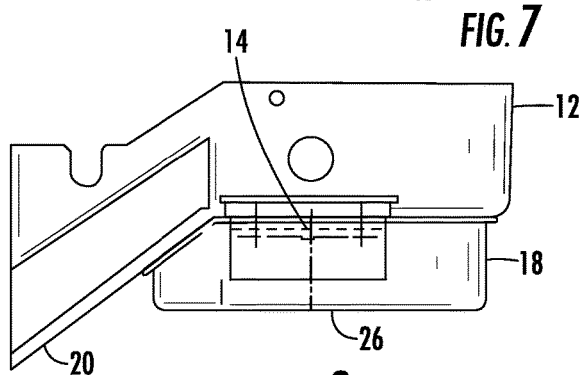
FIG. 8 shows a side view of an assembled ice tray assembly.
Figure 10:
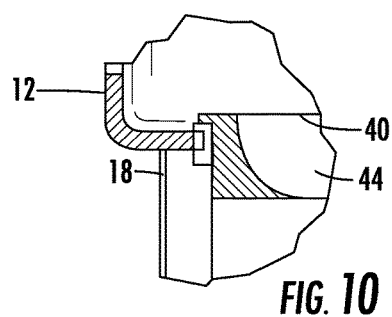
FIG. 10 shows a close-up view of a portion of the assembled ice tray assembly.

The thermally conductive ice tray 14 may be composed of a rigid metal, metal alloy, or any rigid conductive element, such as aluminum, copper, stainless steel, and like alloys. However, it will be understood that the tray 14 may be composed of any thermally conductive material. Further, the tray 14 may include a plurality of thermally conductive receptacles 44 on or within a top surface 46 (as shown in FIGS. 1 and 2) and a recess 48 on the bottom surface 42 sized and configured to receive at least a portion of the heat exchange engine 30 (as shown in FIGS. 5 and 6). The recess 48 may be vertically aligned and co-axial with the aperture 28 of the insulation chamber 18. At least a portion of the surface of each receptacle 44 may be coated with a hydrophobic coating and/or an icephobic coating, which facilitates ejection of the frozen alcohol from the receptacles 44 but does not interfere with the freezing process. For example, each receptacle 44 and/or the entirety of the ice tray 14 may be coated with PTFE or similar material. Additionally or alternatively, each receptacle 44 may include one or more release points 50 into which a specific heat is introduced such as to facilitate release of the frozen alcohol product from the receptacles 44. The properties of solid, frozen alcohol are very different than those of liquid alcohol, and properties between each unique type of alcoholic beverage may also vary widely. The tray top surface 46 may include a portion 52 that does not contain receptacles 44, but the plurality of receptacles 44 may be evenly spaced along the remaining portions of the tray top surface 46. The recess 48 may be at a location within the tray bottom surface 42 that corresponds to the receptacle-free portion 52 of the top surface (as shown in the cross-sectional view of the tray in FIG. 10). In this configuration, at least a portion of the recess 48 may be located within the same plane as at least a portion of each receptacle 44 to maximize thermal exchange between the heat exchange engine 30 and the tray 14, particularly the receptacles 44. As the thermal exchange engine 30 extracts heat from the tray 14, the temperature of the alcoholic liquid within the receptacles 44 will be lowered. The lateral boundaries and the upper boundary (for example, when the ice tray assembly is fully assembled and in use) of the tray recess 48 may be defined by the tray body 14, and the recess 48 does not extend through the top surface of the tray 14 (as shown in FIG. 5).

As discussed above, the tray 14 may be releasably insertable within the frame aperture 22 so it can be removed for cleaning or, alternatively, different sized trays may be exchanged within the frame 12. In that case, a different gasket 16 also may be used that is sized to preserve the seal between the frame 12 and the tray 14. In one configuration, the tray 14 protrudes a distance away from the aperture when the tray is seated within the aperture 22. In other configurations, a thermally conductive adaptor (not shown) may be disposed between the tray 14 and the thermal exchange engine 30 to act as an intermediary to transfer heat from the tray 14. The tray 14 may be sufficiently thick, for example, between approximately one half of an inch thick and approximately two inches, such that heat transfer between the liquid alcohol disposed within the tray receptacles 44 freezes rapidly by conduction. As a non-limiting example, the mass of the tray 14 may be chosen to achieve complete freezing of a volume of liquid alcohol within the receptacles 44 between approximately two minutes and approximately ten minutes. In particular, prior art ice makers use thin-walled dividers in the tray to form a mold to freeze the liquid into a solid. However, these thin-walled molds are too thin to transfer heat by conduction and the liquid within the molds freezes by convection of cold blowing air. In contrast, the tray 14 disclosed herein rapidly cools the liquid alcohol, causing it to freeze into a solid by conduction. Thus, the use of a tray with more or less mass is contemplated to transfer heat efficiently and rapidly.

An exemplary tray configuration is shown in FIGS. 1, 2, and 6, in which the tray 14 includes four thermally conductive receptacles 44, each of which being sized to receive and retain approximately 0.25 fluid ounces of liquid alcohol, for a total of one fluid ounce collectively from all four receptacles 44. However, it will be understood that any number of receptacles and any receptacle size may be used. Each of the receptacles 44 may be concave in shape and define a smooth surface which facilitates the dislodgement of frozen liquid from the receptacles. For example, the receptacles 44 may concave and define a crescent or half-moon shape, which may prevent the cracking and chipping of the receptacles when the contents within are removed and so that the volume of the contents is substantially the same as the volume of the receptacles.

The tray 14 may generally define a body having various features. As discussed above, the tray 14 may include a top or second surface 46 and a bottom or first surface 42. As is shown in FIG. 3, the tray 14 may also include a side wall 58 extending between the top 46 and bottom 42 surfaces. In the tray configuration shown in the figures, the tray 14 may have a substantially rectangular shape, and the side wall 58 may include a first side wall portion 58A, a second side wall portion 58B, a third side wall portion 58C, and a fourth side wall portion 58D, generally corresponding to the sides of the rectangular shape. Additionally, the side wall 58 may include two or more levels 60 that each corresponds to an outer perimeter of the tray 14 (as is shown in FIGS. 3 and 4). For example, the top surface 46 may have a thickness to define a lip that is circumferentially disposed about a portion of the body. For example, the lip may define a first tray perimeter 62 and the side wall immediately proximate the bottom surface 48 may define a second tray perimeter 64, with the first tray perimeter 62 (lip) being greater than the second tray perimeter 64. The side wall 58 may be tapered between the first 62 and second 64 perimeters, or may include one or more levels 60 or steps at which the perimeter changes. In any configuration, however, the first tray perimeter 62 will be the greatest, which may facilitate seating of the tray 14 within the frame aperture 22.

Figure 9:
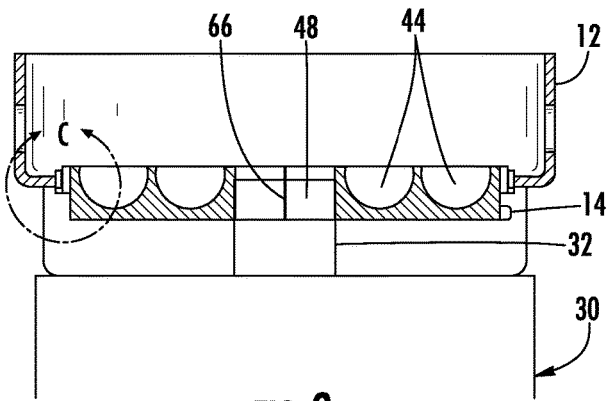
FIG. 9 shows a side view of the assembled ice tray assembly, with the ice tray being shown in cross-sectional view.

When the ice tray assembly 10 is fully assembled, at least a portion of the heat exchange engine 30 may pass through the insulation chamber aperture 28 and be received or located within the tray recess 48 (as shown, for example, in FIG. 9). The heat exchange engine 30 may be, for example, a Stirling engine, or other heat exchange engines or heat pumps known in the art for actively extracting heat from one location and transferring it to another location away from the device, for example, thermosiphons, compressors, or chemical based thermal exchange devices. In an exemplary configuration, the heat exchange engine 30 may be an 80W free piston Stirling motor, which is configured to freeze solid up to approximately two fluid ounces of between 18- and 120-proof alcohol in approximately two to ten minutes is insertable within the housing and substantially cylindrical in shape. The heat exchange engine 30 may include a thermal exchange element 32 that may be in thermal exchange with the tray 14 when the ice tray assembly 10 is assembled. In particular, the thermal exchange element 32 may protrude a distance away from a cylindrical or other portion of the heat exchange engine 30. During operation of the heat exchange engine 30, the thermal exchange element 32 becomes cold as heat is extracted. In particular, the heat exchange engine 30 is configured to lower the temperature of the heat exchange element 32 and, consequently the tray to a temperature of between −100° C. and −18° C. Optionally, a thermally conductive paste and/or thermally conductive grease may be used on the thermal exchange element 32 and/or within the tray recess 48 to increase thermal exchange between the thermal exchange element 32 and the tray 14. The thermally conductive paste may also be used to seal the heat exchange element 32 within the recess 48 and to the ice tray 14.

The tray 14 may include a slit or notch 66 that allows at least a portion of the tray 14 to be compressed heat exchange element 32 is received within the recess 48. The slit or notch 66 may extend inward all the way through the bottom surface 42 of the tray 14 from a point within the tray a distance from the top surface 46 of the tray 14. As can be seen in FIG. 5, the slit or notch 66 does not extend through the tray top surface 46 or through the area of the lateral side wall 58 having the greatest perimeter 62. Additionally, the slit or notch 66 lies along a line that would bisect the recess 48, as shown in FIG. 5. Put another way, the tray 14 may define a thickness T extending between the top 46 and bottom 42 surfaces and the slit or notch 66 may extend partially through the thickness T, from the bottom surface 42 to a location that is between the top 46 and bottom 42 surfaces. The slit or notch 66 may further extend through the side wall of the recess 48. Further, the tray 14 may define a width W and a length L, with the length L being greater than the width W, and the slit or notch 66 may extend across the entire width W of the tray 14. The recess 48 may be centered on the tray bottom surface 42, being at the middle of the tray width W and the middle of the tray length L. The slit or notch 66 may therefore create a partial separation of the tray 14, creating a first lower tray portion 68A and a second lower tray portion 68B.

Although applications have been discussed herein that relate to the alcoholic beverage industry, it will be understood that the principles and devices disclosed herein may also be used for non-alcoholic beverages, culinary applications using food, and in other industries, such as for medical, biomedical, and/or chemical applications for freezing samples.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope the invention.

What is claimed is:

1. A tray assembly for a device for freezing a liquid, comprising:
   a frame defining an aperture;
   a thermally conductive tray sized to be received within the aperture, the thermally conductive tray having a body and a lip circumferentially disposed about the body, the thermally conductive tray being sealed within the aperture with a thermal paste and defining a first surface and an opposite second surface, the first surface defining a recess and the second surface defining a plurality of receptacles; and
   a gasket sized to surround the body and to be disposed between the lip and the frame.

2. The assembly of claim 1, wherein the thermally conductive tray further defines a thickness, a length, a width, and a notch that extends through the thickness from the first surface to proximate the second surface.

3. The assembly of claim 2, wherein the notch substantially bisects the recess of the thermally conductive tray.

4. The assembly of claim 1, wherein the thickness of the body tapers from the second surface to the first surface.

5. The assembly of claim 1, further including an insulation chamber coupled to the frame, wherein the insulation chamber contains an insulation material that is at least one from the group consisting of a gel, a foam, and an aerogel.

6. The assembly of claim 5, wherein the insulation chamber includes an opening substantially equal in area to the recess.

7. The assembly of claim 1, wherein when the thermally conductive tray is seated within the aperture, the recess is substantially co-axial with the opening.

8. The assembly of claim 1, wherein the thermally conductive tray protrudes a distance out away from the aperture when the thermally conductive tray is seated within the aperture.

9. The assembly of claim 1, wherein the thermally conductive tray is recessed within the frame.

10. A tray assembly for a device for freezing a liquid, comprising:
    a frame defining an aperture and a chute;
    a thermally conductive tray recessed within the frame and sized to be received within the aperture, the thermally conductive tray having a body and a lip circumferentially disposed about the body, the thermally conductive tray being sealed within the aperture with a thermal paste and defining a first surface and an opposite second surface, the first surface defining a recess and the second surface defining a plurality of receptacles;

the body defining a thickness, the thickness of the body tapering from the second surface to the first surface; and a gasket sized to surround the body and to be disposed between the lip and the frame.

11. The assembly of claim 10, wherein the recess includes a notch substantially bisecting the recess.

12. The assembly of claim 10, further comprising an insulation chamber coupled to the frame, the insulation chamber defining an opening substantially aligned with the recess, the insulation chamber substantially surrounding the first surface of the thermally conductive tray; and wherein the insulation chamber contains an insulation material that is at least one from the group consisting of a gel, a foam, and an aerogel.

13. The assembly of Claim 12, wherein the opening is substantially equal in area to the recess.

14. The assembly of claim 10, wherein the thermally conductive tray protrudes a distance out away from the aperture when the thermally conductive tray is seated within the aperture.

15. The assembly of claim 10, wherein the plurality of receptacles are coated with PTFE.

16. The assembly of claim 12, wherein the insulation chamber is coupled to the chute.

17. The assembly of claim 16, wherein the chute is disposed at an oblique angle with respect to the frame, and wherein at least a portion of the insulation chamber coupled to the chute defines substantially the same angle as the oblique angle of the chute.

18. A tray assembly for a device for freezing a liquid, comprising:

a frame defining an aperture and a chute;

a thermally conductive tray recessed within the frame and sized to be received within the aperture, the thermally conductive tray protruding a distance out away from the aperture when the thermally conductive tray is seated within the aperture;

the thermally conductive tray having a body and a lip circumferentially disposed about the body, the thermally conductive tray being seated within the aperture and defining a first surface and an opposite second surface, the first surface defining a recess defining a circumference and the second surface defining a plurality of receptacles; the body defining a thickness, the thickness of the body tapering from the second surface to the first surface;

the thermally conductive tray defining a notch substantially bisecting the recess and extending from the first surface to a position proximate the second surface;

a gasket sized to surround the body and to be disposed between the lip and the frame; and an insulation chamber coupled to the frame, the insulation chamber defining an opening substantially aligned and substantially the same circumference as the recess, the insulation chamber substantially surrounding the first surface of the thermally conductive tray; the insulation chamber is coupled to the chute;

the chute being disposed at an oblique angle with respect to the frame, and at least a portion of the insulation chamber coupled to the chute defines substantially the same angle as the oblique angle of the chute.

* * * * *